Figure 1:
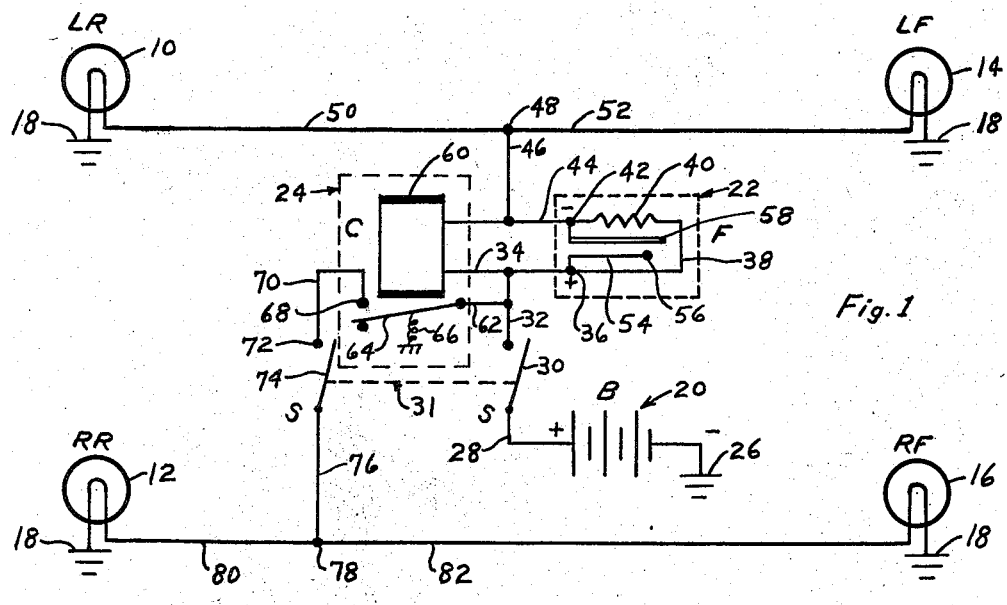

March 3, 1959

R. B. GORDON ET AL 2,876,432

VEHICLE SIGNALLING APPARATUS

Filed April 30, 1956

Roscoe C. McCollum INVENTORS.
Robert B. Gordon
BY Robert D. Mentag

ATTORNEY

United States Patent Office 2,876,432
Patented Mar. 3, 1959

2,876,432

VEHICLE SIGNALLING APPARATUS

Robert B. Gordon, Novi, and Roscoe C. McCollum, Detroit, Mich., assignors, by mesne assignments, to Morris H. Dresner, Huntington Woods, Mich.

Application April 30, 1956, Serial No. 581,423

5 Claims. (Cl. 340—81)

This invention relates to an electronic signalling light apparatus, and, more particularly, to a distress signalling apparatus especially adapted for use on an automobile, or the like, and which includes a pair of front lights and a pair of rear lights, and wherein each light in each of said pairs of said lights may be made to flash on and off alternately, to give a signal lighting effect exactly as a railroad crossing type signal, both from the front and rear of the automobile.

Accordingly, it is the primary object of this invention to provide a signalling light apparatus for use on a vehicle which will provide a sidewise alternating flashing lighting effect, on both the front and rear ends of the vehicle, in the same manner as a railroad crossing signal, and which will give the user thereof added safety protection in the form of accident prevention. With an apparatus of this type, the rear signal lights can be made to flash on and off alternately, and the bright, alternating flash of the rear signal lights will attract the attention of approaching vehicles at a great distance from the vehicle, and will instantly alert the drivers of such vehicles of danger ahead so that they may take any necessary action. As a result, the possibility of a rear end collision in such instances is virtually eliminated.

It is another object of this invention to provide a flashing signalling light of this class which is simple and compact in construction, efficient in operation, and economical of manufacture.

Other objects, features and advantages of this invention will be apparent from the following detailed description and appended claims, reference being had to the accompanying drawing forming a part of the specification wherein like reference numerals designate corresponding parts of the several views.

Figure 2:
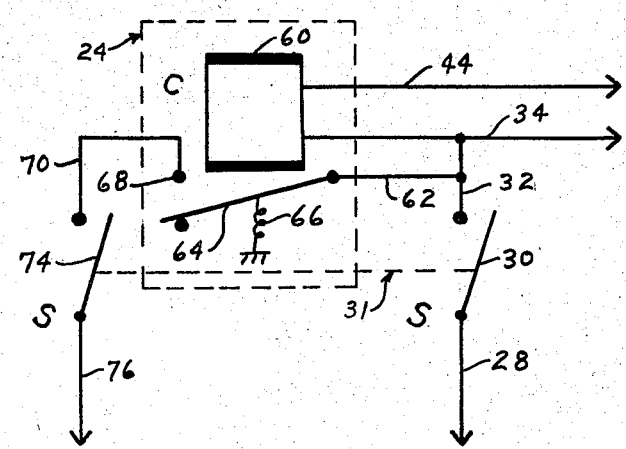

In the drawing:

Fig. 1 is a diagrammatic illustration of a preferred embodiment of the invention; and, Fig. 2 is an enlarged, partial view of a portion of the structure illustrated in Fig. 1.

A signalling apparatus made in accordance with the principles of the invention may be incorporated on any automobile, truck, bus, tractor, trailer, or other vehicle equipped with turn indicator signals. The signalling apparatus of the invention will operate on either 6 volt or 12 volt battery systems. It is not necessary to leave the ignition key on to operate the present signalling apparatus. The ignition may be turned off and the key removed and the signalling apparatus will still function properly. Accordingly, the keys may be used to open the trunk, lock the auto, and so forth.

Referring now to the drawing, the numerals 10 and 12 indicate the rear left and right turn lamps, respectively, which are normally employed in the conventional turn signalling apparatus in present day vehicles. The numerals 14 and 16 indicate the front left and right turn lamps, respectively, in such a turn signalling apparatus. The lamps 10, 12, 14 and 16 are grounded in the usual manner to the vehicle frame, as indicated by the numerals 18. These lamps are electrically interconnected generally by means of the battery 20, the flasher unit 22, and the relay 24, in a manner more fully described hereinafter.

The battery 20 is connected from the positive terminal thereof by means of the lead wire 28 to the switch arm 30 of the double pole single throw switch 31. When closed, the switch arm 30 completes the circuit to the lead wire 32 which is in turn connected to the lead wire 34. The lead wire 34 is connected to the plus or battery terminal 36 of the turn signal flasher 22. The terminal 36 is connected to the lead wire 38 which is in turn connected in series with a heating element 40 to the negative terminal 42 of the turn signal flasher 22. The heating element 40 is shown in the drawings as a resistor, and it has a resistance of approximately 4 ohms. The flasher negative terminal 42 is connected by means of the lead wires 44 and 46 to a connector 48, which is in turn connected by the lead wires 50 and 52 to the left rear and left front turn lamps 10 and 14, respectively. The positive terminal 36 and the negative terminal 42 of the flasher unit 22 are adapted to be interconnected, as more fully explained hereinafter, by means of the lead wire 54 and the stationary contact post 56 which are connected to the positive terminal 36, and by means of the movable contact 58 which is connected to the negative terminal 42.

The coil 60 of the relay 24 is connected across the terminals of the flasher unit 22, by means of the lead wires 34 and 44, whereby the coil is connected in parallel with the flasher unit. The lead wire 32 is connected to the lead wire 62 which is connected to the arm 64 of the movable contact of the relay 24. The relay movable contact 64 is normally biased in one direction by the usual spring 66 when the coil 60 is not energized. The relay stationary contact 68 is connected by means of the lead wire 70 to the stationary contact 72 of the double pole single throw switch 31. The second arm 74 of the double pole single throw switch 31 is connected by the lead wire 76 to the connector 78 which is in turn connected to the lead wires 80 and 82 which connect with the right rear and right front turn lamps, respectively.

In the use of the invention, the flasher 22, relay 24 and the switch 31 would be mounted on any suitable mounting bracket and in any suitable location on the vehicle where it is convenient for the driver to throw the switch 31. As for example, these units may be installed under the dash, cowl and so forth.

In order to put the safety signalling apparatus in operation, the double pole single throw switch 31 is manually closed by the driver. Battery voltage is thus applied to the flasher unit 22. Current flows from the battery 20, through the wires 28, 32, 34, and 38 to the heating element 40, through the signal lamps (either left or right) and through the ground back to the battery. The flasher movable contact 58 is a bi-metallic strip which is disposed adjacent and parallel to the heating element 40. The flasher contacts 56 and 58 are separated or open when the flasher is cool or inoperative. As the current flowing through the heating element causes it to heat up, the bi-metallic movable strip contact 58 also heats up by conduction and convection and it bends toward and makes contact with the stationary contact post 56. This action connects the signal lights 10 and 14, on the left side of the vehicle to the battery causing them to light. This action also shorts out the heating element 40 causing it to cool. The bi-metallic contact 58 in turn cools, bends away from and breaks contact with the stationary contact post 56. Current then flows through the heating element 40 again and the aforementioned cycle repeats itself. This action causes the left rear and left front signal lamps 10 and 14 to flash in a periodic manner.

The left rear and left front signal lamps 10 and 14 do not light during the period that the heating element 40 is in series with them due to the low resistance (0.8 ohm approximately) of the lamps with respect to the resistance of the heating element 40 (about 4 ohms). Thus, the flasher unit 22 acts as a periodic switch with respect to the left rear and left front signal lamps.

The operation of the right rear and right front signal lamps 12 and 18, respectively, during the period when the left signal lamps are extinguished is as follows. It will be seen in Fig. 1 that the lead wires 34 and 44 are connected to the coil 60 of the relay 24 as well as to the contacts 36 and 42, respectively, of the flasher unit 22. The resistance of the coil of relay 24 is approximately 15 ohms, which is a relatively high impedance with respect to the heating element 40 of the flasher unit 22.

Relay 24 operates, pulls the arm 64 into engagement with the stationary contact 68, during the interval that the contacts 58 and 56 of the flasher unit 22 are open. During said interval, the heating element 40 of the flasher is paralleled across the coil 60 of relay 24, however, the tension of spring 66 is adjusted so that the relay 24 will still operate properly even with the 4 ohm resistance of the heating element 40 across the relay coil 60. The relay coil current path is completed through the left signal lamps 10 and 14, since they offer negligible impedance to the relay coil current, and back to the battery through the ground. Thus, it will be seen, that the relay 24 operates every time that the contacts 56 and 58 of the flasher unit 22 are open.

The battery 20 is connected to the moving contact 64 of the relay 24, through the wires 62, 32 and 28. The stationary contact 68 of the rleay 24 is connected through the wires 70, 76, 80 and 82 to the right rear and right front signal lamps 12 and 16, respectively. Thus, every time the relay 24 operates, battery voltage is applied to the right side signal lamps 12 and 16. When the flasher unit contacts 56 and 58 are closed, battery voltage is applied to the left side signal lamps 10 and 14 and they will light up. Since the contacts 56 and 58 also connected across the relay 24 when said contacts are closed, the coil 60 of the relay is shorted and the relay releases the arm 64. Thus, the signal lamps 12 and 16 on the right side of the vehicle are extinguished when the signal lamps 10 and 14 on the left side of the vehicle are lit, and vice versa.

The aforegoing action gives the signal lamps (left and right) a periodic, flashing and alternating action. This is the primary feature of the signalling apparatus of the invention. This alternate flashing, on and off, left to right, is an immediate, eye-catching, attention demanding action. Vehicles using this device which are standing, parked, or stalled in the street, or to one side thereof, are immediately seen by drivers of other vehicles and such action alerts the drivers to the fact that such vehicles are non-moving vehicles. This action of the sidewise flashing lights alerts approaching drivers well in advance to the proximity of the non-moving vehicle and is a big factor in reducing rear end collisions and similar accidents.

Although the signalling apparatus has been illustrated as a separate wired circuit, it will be understood, that the turn signal circuits already installed in vehicles could be partially used by merely wiring in the relay 24 and the switch 31 in the appropriate places. In such event, the turn signal lever would have to be moved to the position to turn on the left side lights to complete the circuit in the lead wire 46, between the connector 48 and the flasher terminal 42.

The safety signalling apparatus of the present invention in no way affects the normal operation of the vehicle or the usual turn signal system when the apparatus is turned to its off position. Likewise, no possible combination of switching arrangements with the ignition key, turn signal selector lever, and the signalling apparatus can damage any of the components of the vehicle or the signalling apparatus itself.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What we claim is:

1. A signalling apparatus for a vehicle of the class described, comprising: a first pair of lights adapted to be mounted on the one side of the vehicle in a laterally spaced apart arrangement; a second pair of lights adapted to be mounted on the other side of the vehicle in a laterally spaced apart arrangement; a direct current source; a flasher unit interconnected between said direct current source and one of said pairs of lights; said flasher unit being adapted to periodically break the current flow to the lights in said one pair of lights; a relay interconnected between said direct current source and the other of said pairs of lights for periodically breaking the current flow to said other pair of lights; said relay being connected in parallel with said flasher unit and being of a higher impedance than said flasher unit, whereby, when the flasher unit functions to pass current therethrough the relay will not operate and when the flasher unit functions to break the current flow therethrough the relay will operate; and, a switch means connected between said direct current source and the flasher unit for disabling the signalling apparatus.

2. The structure as set forth in claim 1, wherein: said flasher unit includes a pair of terminals; a first circuit connecting said terminals and having a heating element contained therein; and, a second circuit connecting said terminals and adapted to be completed and broken by means of a movable contact actuated by said heating element in said first circuit.

3. A signalling apparatus for a vehicle of the class described, comprising: a first pair of lights adapted to be mounted on one side of a vehicle on the front and rear ends thereof; a second pair of lights adapted to be mounted on the other side of a vehicle on the front and rear ends thereof; a direct current source; a flasher unit for making and breaking a circuit in a periodic manner; a first circuit means connecting said direct current source with said flasher unit; a second circuit means connecting said flasher unit with said first pair of lights; a relay connected in parallel with said flasher unit and being of a higher impedance than said flasher unit; a third circuit means adapted to be closed and opened by said relay and interconnecting said direct current source and said second pair of lights; and switch means adapted to disable said third circuit means.

4. In a signalling system for a vehicle having a first pair of lights on one side thereof, and a second pair of lights on the other side thereof, wherein said first pair of lights are connected to a power source by means of a first switch means and the second pair of lights are connected to a power source by an electrical flasher unit so that the lights in either of said pairs of lights may be selectively lit in a flashing manner, the improvement wherein, a relay of higher impedance than said flasher unit is connected in parallel with said flasher unit, and a second switch means operable by said relay is connected between said power source and said first pair of lights, whereby, when the flasher unit closes the circuit from the power source to the second pair of lights the relay will be shorted and said first pair of lights will be inoperative, and, when the flasher unit opens the circuit to the second pair of lights the relay will be operated and said first pair of lights will be operated, and said pairs of lights will be thus operated in an alternate flashing manner.

5. An apparatus for connecting a pair of electrical devices to a direct current source for alternate energization of said devices, comprising: a flasher unit interconnected between said direct current source and one of said electrical devices; said flasher unit being adapted to periodically break the current flow to said one electrical device; a relay interconnected between said direct current source and the other of said electrical devices for periodically breaking the current flow to said other electrical device; said relay being connected in parallel with said flasher unit and being of a higher impedance than said flasher unit, whereby, when the flasher unit functions to pass current to said one electrical device the relay will not operate and when the flasher unit functions to break the current flow therethrough the relay will operate to pass current to said other electrical device; and, a switch means connected between said direct current source and the flasher unit for disabling the apparatus.

References Cited in the file of this patent

UNITED STATES PATENTS

| | | |
|---|---|---|
| 2,103,276 | Schmidinger | Dec. 28, 1937 |
| 2,304,963 | Smith | Dec. 15, 1942 |
| 2,692,981 | Hollins | Oct. 26, 1954 |
| 2,706,809 | Hollins | Apr. 19, 1955 |